UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF MAKING PLASTIC COMPOSITIONS.

1,229,485. Specification of Letters Patent. Patented June 12, 1917.

No Drawing. Original application filed May 23, 1912, Serial No. 699,234. Divided and this application filed July 10, 1915. Serial No. 39,190.

*To all whom it may concern:*

Be it known that I, WILLIAM G. LINDSAY, a citizen of the United States, residing at Caldwell, in the county of Essex and State of New Jersey, have invented certain new and useful Improvements in Processes of Making Plastic Compositions, of which the following is a specification.

The various compositions to which the present invention relates are employed in the arts, sometimes as imitations of natural substances, and sometimes as films which are used for photographic purposes, whether as the base upon which the sensitive coating is superimposed or as a component part of the film with which the sensitized substance has been partially incorporated in the sensitization. Although the final or useful form of the different compounds of acetyl cellulose is that of a solid or dry material, the different processes of conversion into this final solid form involve, as is well understood, the employment of solutions or mixtures of varying consistencies as to elasticity, stiffness or fluidity, depending generally upon the proportion or kind of solvent used to the amount of the original base—acetyl cellulose.

This application is a division of my earlier application Serial No. 699,234 filed May 23, 1912.

In the treatment of acetyl cellulose for the production of solutions for the manufacture of lacquers, varnishes, photographic films, and flexible or plastic compounds, I have discovered that chloroform in admixture with ethyl or methyl alcohol produces a compound solvent for acetyl cellulose of the variety which is freely soluble in acetone and also of the so-called triacetate of cellulose, possessing valuable properties in the manufacture of films or plastic masses.

The following examples will instruct the operator as to the methods of employing these new solvents:—

To 100 parts of acetyl cellulose (so-called triacetate of cellulose) I add from 30 to 40 parts either of paraethyltoluolsulfonamid, ethyl acetanilid, tetrachlorethyl acetanilid, methyl acetanilid, or camphor, and then put into the mixture 100 parts of chloroform in admixture with 10 to 20 parts of either ethyl or methyl alcohol. The mixture is then stirred or otherwise kneaded, and after a uniform mixture has been obtained the volatile solvent is allowed to evaporate to the extent of about 70 parts during the stirring or mixing operation. The dough-like mass thus obtained is then rolled or worked up in the manner of manufacturing nitro-cellulose-camphor compounds.

Again, to 100 parts of acetyl cellulose of the acetone-soluble variety described, I add 30 to 50 parts of paraethyltoluolsulfonamid, or one of the other solid substances named,— (ethyl acetanilid, tetrachlorethyl acetanilid, methyl acetanilid, camphor), and then add 50 to 70 parts of chloroform mixed with an equal volume of methyl or ethyl alcohol. After a thorough incorporation and kneading, the excess of solvent is allowed to evaporate in the further manipulation, and the resultant dough-like product is further worked up in the well-known manner for making nitro-cellulose-camphor compounds.

By paraethyltoluolsulfonamid, I mean the compound having the following structural formula—

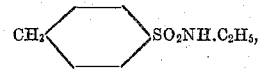

the same being an alkylated aromatic sulfonamid.

Having thus described my invention, what I claim is:

1. The process of making plastic compositions from acetyl cellulose which comprises mixing said acetyl cellulose with chloroform and a monohydric alcohol having not more than two carbon atoms to produce a gelatinous mass.

2. The process of making plastic compositions from acetyl cellulose which comprises mixing said acetyl cellulose with chloroform and a monohydric alcohol having not more than two carbon atoms to produce a gelatinous mass, and mixing therewith a solid substance which is a solvent for acetyl cellulose in the presence of said chloroform and alcohol.

3. The process of making plastic compositions from acetyl cellulose which comprises mixing said acetyl cellulose with chloroform and a monohydric alcohol having not more than two carbon atoms to produce a gelatinous mass, mixing therewith a solid substance which is a solvent for acetyl cellulose in the presence of said chloroform and alcohol, allowing the excess of the volatile solvent to evaporate and suitably manipulating the resulting mass.

4. The process of making plastic compositions from acetyl cellulose which comprises mixing said acetyl cellulose with chloroform and a monohydric alcohol having not more than two carbon atoms to produce a gelatinous mass, and mixing therewith an aromatic sulfonamid which is a solvent for acetyl cellulose in the presence of said chloroform and alcohol.

5. The process of making plastic compositions from acetyl cellulose which comprises mixing said acetyl cellulose with chloroform and a monohydric alcohol having not more than two carbon atoms to produce a gelatinous mass, mixing therewith an aromatic sulfonamid which is a solvent for acetyl cellulose in the presence of said chloroform and alcohol, allowing the excess of the volatile solvent to evaporate and suitably manipulating the resulting mass.

6. The process of making plastic compositions from acetyl cellulose which comprises mixing said acetyl cellulose with chloroform and a monohydric alcohol having not more than two carbon atoms to produce a gelatinous mass, mixing therewith an alkylated aromatic sulfonamid which is a solvent for acetyl cellulose in the presence of said chloroform and alcohol, allowing the excess of the volatile solvent to evaporate and suitably manipulating the resulting mass.

7. The process of making plastic compositions from acetyl cellulose which comprises mixing 100 parts of acetyl cellulose with 100 parts of a chloroform ingredient to produce a gelatinous mass, said chloroform ingredient comprising chloroform and from 10 to 20 parts of a monohydric alcohol having not more than two carbon atoms.

8. The process of making plastic compositions from acetyl cellulose which comprises mixing 100 parts of acetyl cellulose with 100 parts of a chloroform ingredient to produce a gelatinous mass, said chloroform ingredient comprising chloroform and from 10 to 20 parts of a monohydric alcohol having not more than two carbon atoms, and mixing therewith from 30 to 40 parts of a solid substance which is a solvent for said acetyl cellulose in the presence of said chloroform and alcohol.

9. The process of making plastic compositions from acetyl cellulose which comprises mixing 100 parts of acetyl cellulose with 100 parts of a chloroform ingredient to produce a gelatinous mass, said chloroform ingredient comprising chloroform and from 10 to 20 parts of a monohydric alcohol having not more than two carbon atoms, and mixing therewith from 30 to 40 parts of an aromatic sulfonamid which is a solvent for said acetyl cellulose in the presence of said chloroform and alcohol.

In testimony whereof I affix my signature.

WILLIAM G. LINDSAY.